United States Patent
Nakanishi et al.

(10) Patent No.: US 7,842,433 B2
(45) Date of Patent: Nov. 30, 2010

(54) FUEL CELL SEPARATOR PLATE AND METHOD FOR PRODUCING IT

(75) Inventors: Yoshihiro Nakanishi, Saitama-ken (JP); Yuichiro Kosaka, Saitama-ken (JP); Kentaro Nagoshi, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 676 days.

(21) Appl. No.: 10/279,132

(22) Filed: Oct. 24, 2002

(65) Prior Publication Data

US 2003/0087143 A1    May 8, 2003

(30) Foreign Application Priority Data

Oct. 25, 2001 (JP) ............................. 2001-328246

(51) Int. Cl.
H01M 2/14 (2006.01)
H01M 2/20 (2006.01)

(52) U.S. Cl. ................. 429/518; 429/469; 429/508; 429/514; 429/457; 429/521

(58) Field of Classification Search ............ 429/34, 429/35, 38, 39
See application file for complete search history.

(56) References Cited

U.S. PATENT DOCUMENTS

| | | | | |
|---|---|---|---|---|
| 4,197,178 A * | 4/1980 | Pellegri et al. | ............... | 204/255 |
| 4,755,429 A * | 7/1988 | Nickols et al. | ............... | 428/408 |
| 6,037,075 A * | 3/2000 | Critz et al. | ............... | 429/36 |
| 6,348,279 B1 * | 2/2002 | Saito et al. | ............... | 429/34 |
| 6,451,468 B1 * | 9/2002 | Adachi | ............... | 429/34 |
| 6,495,278 B1 * | 12/2002 | Schmid et al. | ............... | 429/30 |
| 7,172,830 B2 | 2/2007 | Mizuno | | |
| 2002/0012825 A1 * | 1/2002 | Sasahara et al. | ............... | 429/30 |
| 2002/0160248 A1 * | 10/2002 | Takao et al. | ............... | 429/30 |

FOREIGN PATENT DOCUMENTS

| | | |
|---|---|---|
| JP | 09-055215 | 2/1997 |
| JP | 09-167623 | 6/1997 |
| JP | 10-189011 | 7/1998 |
| JP | 10189011 A * | 7/1998 |
| JP | 11-204120 | 7/1999 |
| JP | 11-297338 | 10/1999 |
| JP | 11297338 A * | 10/1999 |

OTHER PUBLICATIONS

Moore, J.H., ed. Encyclopedia of Chemical Physics and Physical Chemistry. 2001. Institute of Physics. A.3.10.4.1.*
Web site for surface roughness convertion: http://www.innovativeorganics.com/Media/Documents/S0000000000000001030/SURFACE%20ROUGHNESS%20VALUE%20CONVERSIONS.pdf.*

* cited by examiner

Primary Examiner—Keith Walker
(74) Attorney, Agent, or Firm—Fish & Richardson P.C.

(57) ABSTRACT

A fuel cell separator plate comprising a portion in contact with an electrode, and a sealing portion provided around the contact portion, the contact portion having a larger surface roughness (Rmax) than that of the sealing portion. It is preferably a molded separator plate made of a composite carbon material comprising carbon and a thermosetting resin.

2 Claims, 4 Drawing Sheets

FUEL CELL SEPARATOR PLATE AND METHOD FOR PRODUCING IT

FIELD OF THE INVENTION

The present invention relates to a fuel cell separator plate having low contact resistance with an electrode and excellent gas tightness.

DESCRIPTION OF PRIOR ART

Because a solid polymer electrolyte fuel cell can generate electricity at lower temperatures and at higher output density than other fuel cells such as a phosphoric acid fuel cell, etc., it is expected that the solid polymer electrolyte fuel cell is used not only as a power supply for automobiles but also as a small mobile power supply. The solid polymer electrolyte fuel cell may be a stack constituted by unit fuel cells (membrane-electrode assemblies) laminated via separator plates, each unit fuel cell being constituted by an electrolyte membrane, which is a high-molecular-weight ion-exchange membrane such as a fluororesin-type ion-exchange membrane usually having a sulfonic acid group, etc., and catalytic electrodes carrying a platinum catalyst formed on both surfaces of the electrolyte membrane. Among these constituent parts, a separator plate not only has a role of securing flow paths for supplying a fuel gas (hydrogen) and an oxidizing gas (oxygen or air) to each corresponding electrode while separating these gases from each other, but also has a role of conducting electricity generated by the fuel cell to external terminals. To achieve these roles sufficiently, the separator plate of the fuel cell is required to have not only excellent gas tightness but also low contact resistance with an electrode. To meet such demands, not only is the separator plate formed by conductive materials such as carbon materials, metal materials, etc., but also each surface of the separator plate is roughened for decrease in contact resistance. Such fuel cells are disclosed in JP 9-55215 A, JP 10-189011 A, JP 11-297338 A, etc.

However, the roughening of the separator plate by a surface treatment, etc. to reduce contact resistance between the separator plate and an electrode leads to decrease in the gas tightness of the fuel cell. On the other hand, if each surface of the separator plate is kept smooth to suppress gas leak, the contact resistance would be increased. Accordingly, it is difficult to simultaneously meet all of the above conditions required for the separator plate.

OBJECT OF THE INVENTION

Accordingly, an object of the present invention is to provide a fuel cell separator plate having low contact resistance with an electrode and excellent gas tightness, and a method for producing such a fuel cell separator plate.

SUMMARY OF THE INVENTION

As a result of intensive research in view of the above object, the inventors have found that the contact resistance of the separator plate with the electrode can be reduced by surface-roughening a portion of the separator plate, which is to be in contact with the electrode, and that the gas tightness can be increased with gas leak suppressed by keeping smooth a surface of a sealing portion of the separator plate, which does not contact with the electrode. The present invention has been achieved based on these findings.

Thus, the fuel cell separator plate of the present invention comprises a portion in contact with an electrode, and a sealing portion provided around the contact portion, the contact portion having a larger surface roughness (Rmax) than that of the sealing portion.

The fuel cell separator plate of the present invention is preferably a molded separator plate made of a composite carbon material, and the composite carbon material preferably comprises carbon and a thermosetting resin. It is also preferable that the contact portion has a surface roughness (Rmax) of 10-50 μm, and that the sealing portion has a surface roughness (Rmax) of 2-15 μm.

The method of the present invention for producing a fuel cell separator plate comprising a portion in contact with an electrode, and a sealing portion provided around the contact portion comprises the steps of masking the sealing portion, and roughening a surface of the contact portion.

The roughening step is preferably carried out by at least one selected from the group consisting of etching, blasting and grinding. It is also preferable that the sealing portion has a surface roughness (Rmax) of 2-15 μm, and the roughened contact portion has a surface roughness (Rmax) of 10-50 μm.

The fuel cell separator plate produced by the method of the present is preferably a molded separator plate made of a composite carbon material, and the composite carbon material preferably comprises carbon and a thermosetting resin.

DETAILED DESCRIPTION OF THE PREFERRED EMBODIMENTS

Figure 1:
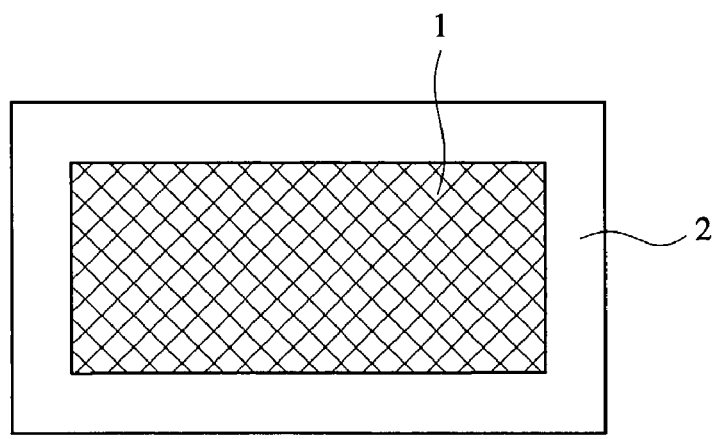
FIG. 1 is a plan view showing a separator plate whose sealing portion is masked.

[1] Fuel Cell Separator Plate (1) Constituent Materials

Materials for constituting the fuel cell separator plate may be carbon materials, metal materials, composite metal materials containing metals and carbon or resins, composite carbon materials containing carbon and resins, etc. Among them, the composite carbon materials are particularly preferable from the aspect of corrosion resistance, gas tightness and moldability.

Though not restrictive, carbon powder used for the composite carbon materials may be synthetic graphite, flake graphite, amorphous graphite, expanded graphite, Kish graphite, carbon black, acetylene black, KETJEN BLACK (carbon black manufactured by Akzon Nobel Co., Ltd.), coke dust, these mixtures, etc.

The resins used for the composite carbon materials may be either thermoplastic resins or thermosetting resins, and the thermosetting resins are particularly preferable. The preferred thermoplastic resins are polyethylene, polypropylene, polystyrene, polyvinyl chloride, polyvinylidene chloride, polyvinyl alcohol, polyacrylonitrile, polyacrylic acid, polyamides, polyesters, polycarbonates, polyacetals, poly(meth)acrylate, polyurethanes, polyphenylene ether, polyphenylene sulfide, polyethersulfone, polyetherketone, polyeteretherketone, polyoxamethylene, polyarylate, aramides, polyimides, polyeterimides, fluorine resins, these mixtures, etc. The preferred thermosetting resins are phenol resins, urea resins, melamine resins, alkyd resins, unsaturated polyester resins, diallyl phthalate resins, epoxy resins, silicone resins, polycarbodiimide resins, furfuryl alcohol resins, cellulose, etc.

The preferred metal materials are Ti or its alloys, Cr or its alloys, Zr or its alloys, Hf or its alloys, Ta or its alloys, Fe or its alloys, Ni or its alloys, Cu or its alloys, Al or its alloys, Nb or its alloys, V or its alloys, etc. These metal materials may further have coatings of Ti, Ni, Cr, Au, Ag, Cu, Pt, Hf, Ta, Nb, Fe, etc. on their surfaces. Such coatings may be formed by methods such as chemical vapor deposition (plasma CVD, laser CVD, etc.), physical vapor deposition (vacuum vapor deposition, sputtering, ion plating, etc.), electroplating, electroless plating, etc. The resins used for the composite metal materials may be the same as those used for the composite carbon materials. The composite metal materials may be formed by coating the above metal materials with carbon or resins by spraying, immersion, etc.

(2) Surface Roughness

The fuel cell separator plate of the present invention is characterized in that the surface roughness (Rmax) of a portion in contact with an electrode is larger than that of a sealing portion. In a separator plate molded from carbon powder and a resin such as a thermosetting resin as a binder, the resin tends to be segregated in a surface portion because of the difference in their melting temperatures. If such separator plate is used without treatment, it exhibits high electric resistance (contact resistance) because the resin covering the surface of the separator plate is an electric insulator, resulting in large voltage loss and thus low performance. To decrease contact resistance with an electrode, the fuel cell separator plate of the present invention is deprived of a resin in advance in a surface area, which is to be brought into contact with an electrode, thereby having a large surface roughness (Rmax) in a portion in contact with the electrode. On the other hand, if a resin were removed from the separator plate in a surface area in its sealing portion, the sealing portion would have a roughened surface, failing to secure its tightness for a fuel gas, an oxidizing gas and cooling water. Accordingly, the sealing portion is kept in an as-molded state without surface treatment, so that it can suppress leak because of increased gas tightness. Thus, with a portion in contact with an electrode provided with a higher surface roughness (Rmax) than that of a sealing portion, the separator plate can have decreased contact resistance and increased gas tightness simultaneously.

In the case of the fuel cell separator plate formed by a carbon material, a metal material, etc., there is no increase in contact resistance due to a resin. However, if the separator plate has a flat surface, there is only a small area in its portion in contact with an electrode, resulting in increase in contact resistance. Accordingly, regardless of the material of the separator plate, it is necessary that a portion of the separator plate in contact with the electrode have a larger surface roughness (Rmax) than that of the sealing portion to decrease its contact resistance with the electrode.

Specifically, the surface roughness (Rmax) of the contact portion is preferably 10-50 μm, more preferably 15-40 μm. The surface roughness (Rmax) of the sealing portion is preferably 2-15 μm, more preferably 5-10 μm. Here, the surface roughness (Rmax) means the maximum height (determined according to JIS B 0601-1982) of a cross section curve indicating the shape of roughness in each portion selected from each surface of the separator plate at random, which is a value measured by a stylus method using a surface roughness meter. When the contact portion has a surface roughness (Rmax) of less than 10 μm, the removal of the resin is insufficient, resulting in high contact resistance. On the other hand, when the surface roughness (Rmax) exceeds 50 μm, the surface of the separator plate is so rough that the percentage of a portion in contact with the electrode is too small, rather resulting in increase in contact resistance. When the sealing portion has a surface roughness (Rmax) of less than 2 μm, the engagement of the seal with the separator plate is insufficient, resulting in decrease in the gas tightness. On the other hand, when it exceeds 10 μm, the surface becomes rough, resulting in decreased gas tightness.

[2] Method for Producing Fuel Cell Separator Plate

The method for producing the separator plate of the present invention will be explained below, taking as an example a composite carbon material containing carbon and a resin as a material for constituting the fuel cell separator plate, though it is not restricted to the composite carbon material.

(1) Production of Molded Separator Plate

Carbon powder and a resin are mixed preferably at such a ratio that the carbon powder is 60-85% by weight and the resin is 40-15% by weight, both based on the total amount. Carbon powder and the resin may be those specifically described above. The mixing of carbon powder and a resin can be carried out by usual blending machines such as a kneader, a compression kneader, a double-screw blender, a ball mill, a mixer, etc. Usable in this case if necessary is a method in which the resin is dissolved in a proper organic solvent such as alcohol, ether, etc. to lower its viscosity, with the organic solvent removed after blending with carbon powder.

The molding of the resultant blend into an arbitrary fuel cell separator plate may be carried out by a known molding method. Generally preferable from the aspect of productivity is a molding method, for instance, a press molding method, a transfer molding method, an injection molding method, etc.

(2) Surface Roughening

By roughening a surface of a portion of the separator plate brought into contact with an electrode, a resin portion covering each surface of the separator plate is removed in advance.

(A) Masking

Surface roughening is carried out only in a portion of the separator plate, which is to be in contact with the electrode, but not in a sealing portion thereof. Accordingly, after masking the sealing portion in advance, a surface treatment is carried out in the contact portion. There is no limitation in a mask, and a proper mask may be selected from a plate, a tape, coating, etc. depending on a surface treatment method. Incidentally, because the sealing portion has surface smoothness on the same level as that of a molding die cavity, it need not be subjected to any working or treatment.

(B) Treatment Method

The surface treatment is preferably carried out by at least one method selected from the group consisting of etching, blasting and grinding.

After masking the sealing portion of the separator plate, etching is carried out by immersion, coating, etc. using an acid or alkali solution. The preferred acids used for etching are hydrochloric acid, sulfuric acid, nitric acid, acetic acid, formic acid, fluoric acid, etc., and the preferred alkalis are sodium hydroxide, potassium hydroxide, ammonia, dimethylamine, etc. Conditions such as a solution for etching, the concentration of a solution, immersion time, etc. may be properly selected depending on the type of a resin.

Figure 2:
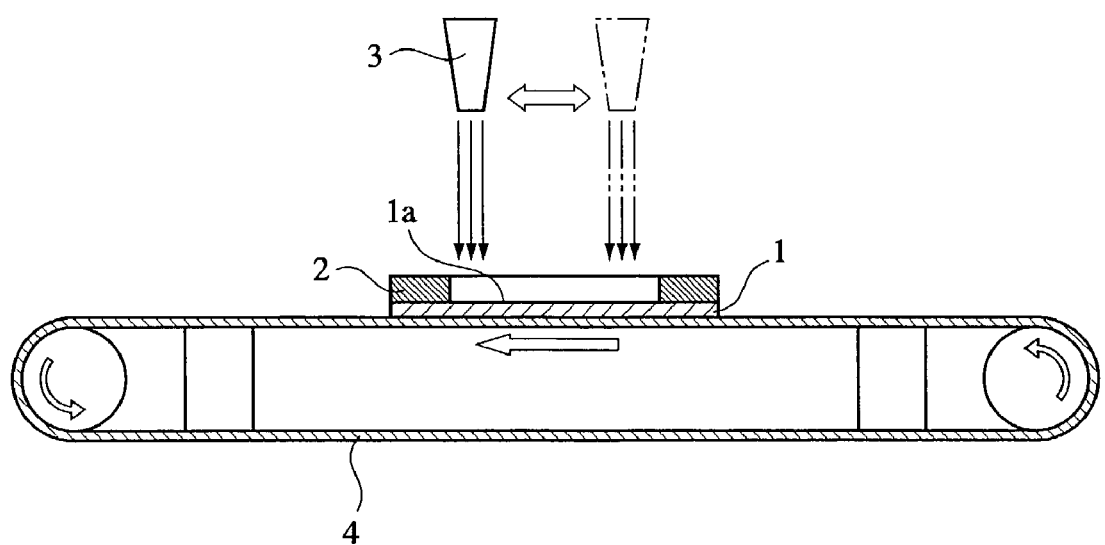
FIG. 2 is a cross-sectional view showing the blasting step of a separator plate.

In the case of blasting, after masking the sealing portion of the separator plate, mineral or vegetable abrasives, etc. are blasted at a high speed onto a portion of the separator plate, which is to be in contact with an electrode, to remove a resin covering each surface of the separator plate. FIGS. 1 and 2 show the preferred embodiment. As shown in FIG. 1, a masking plate 2 having the same shape as a sealing portion is formed and placed on a separator plate 1, such that only a portion 1a of the separator plate 1, which is to be in contact with an electrode, is exposed. Next, the masked separator plate is placed on a belt conveyor 4, so that it is conveyed on the belt conveyor 4 at a predetermined rate. A gun 3 for shot-blasting beads is disposed above the belt conveyor 4, to blast abrasive beads onto a portion 1a of the conveyed separator plate 1, which is to be in contact with an electrode, at a high speed. The gun 3 for shot-blasting beads moves back and forth (vibrates) while rotating, to blast abrasives repeatedly to remove a resin covering each surface of the separator plate portion 1a. The strength of blasting may be adjusted by changing conditions such as the types of abrasives, the diameters of abrasive beads, ejecting pressure, nozzle height, treatment time, etc.

In the case of grinding, after masking the sealing portion of the separator plate 1, it is carried out, for instance, by a grinding method (grinder buffing) using a grinding wheel having abrasives on a surface, or by a method (brush grinding) using a brush or a grinding wheel having music wires, stainless steel wires, brass wires, etc.

(C) Surface Roughness

Figure 3:
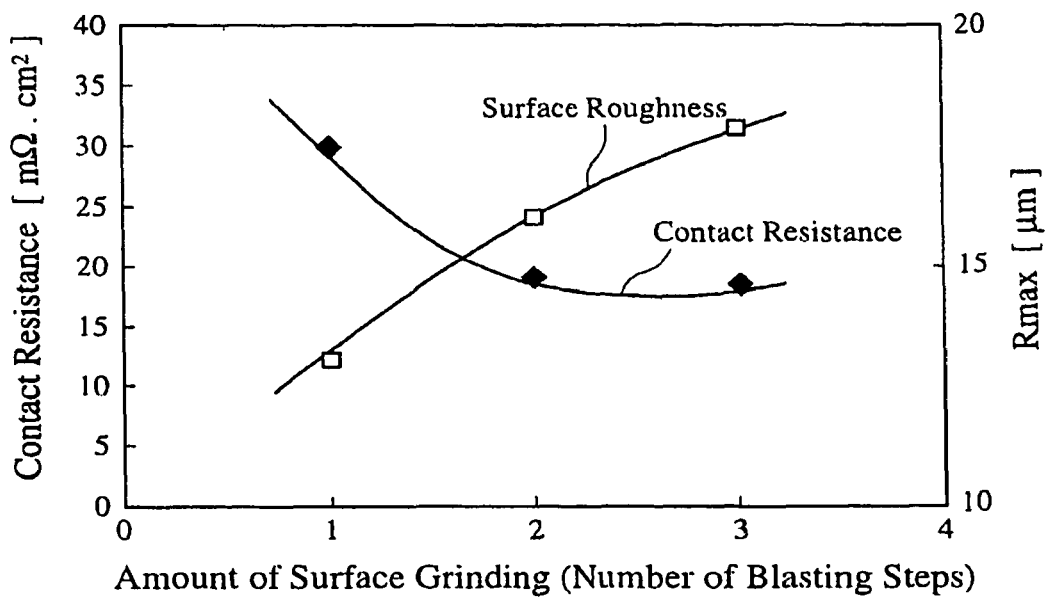
FIG. 3 is a graph showing the variation of contact resistance relative to the extent of surface grinding.

As each surface of the separator plate 1 is ground by the above surface treatment method, the surface roughness (Rmax) of the separator plate 1 increases, and thus the separator plate 1 has a lowered contact resistance. When the extent of surface grinding reaches a certain level or more, the contact resistance becomes constant. FIG. 3 shows the variation of contact resistance relative to the extent of surface grinding. There is a proper amount of grinding for reducing the resistance, and when grinding is performed until the surface roughness (Rmax) reaches about 15-20 μm, the resistance tends to become substantially constant. This indicates that surface roughening is carried out to a surface roughness (Rmax) of preferably 10-50 μm, more preferably 15-40 μm.

[3] Seal

A fuel gas, an oxidizing gas and a coolant should pass through separate paths to avoid their mixing. In addition, it is necessary to prevent these reaction gases and cooling medium from leaking from a fuel cell. Therefore, to supply a fuel gas, an oxidizing gas, humidifying water and a cooling medium to each cell, seals are provided around holes penetrating stacks, in a periphery of each unit fuel cell composed of an electrolyte membrane, catalytic electrode layers and gas diffusion layers, around flow paths for a coolant passing along a surface of the separator plate for cooling the separator plate, and in a periphery of each separator plate on both surfaces, etc. Because the fuel cell separator plate of the present invention has a large surface roughness only in a portion in contact with the electrode, and has a sealing portion kept smooth, it is excellent in gas tightness by sealing.

Figure 4:
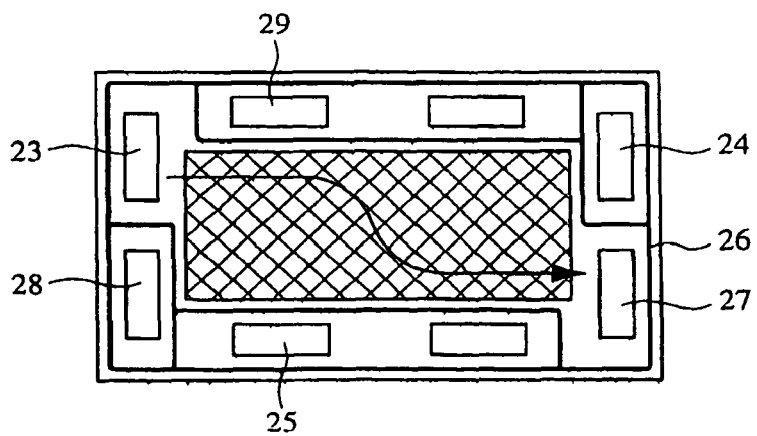
FIG. 4 is a plan view showing a separator plate provided with fuel gas flow paths by a seal.
Figure 5:
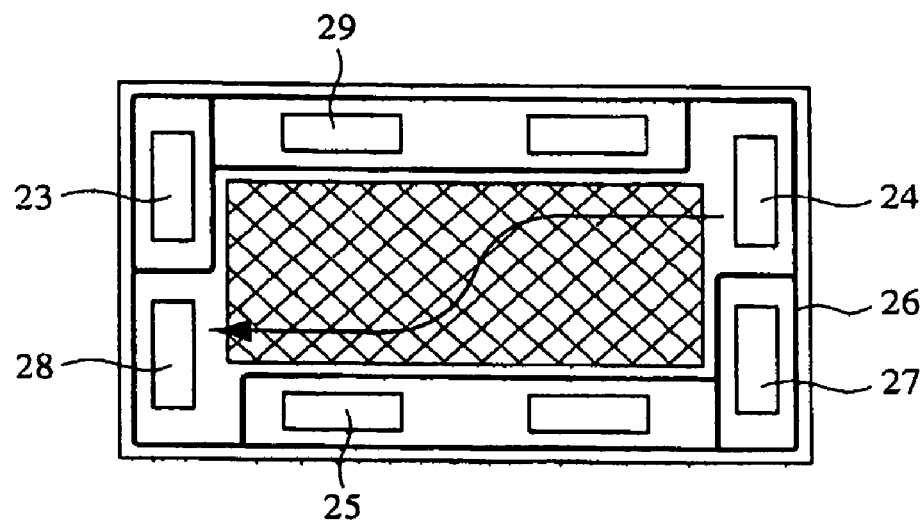
FIG. 5 is a plan view showing a separator plate provided with oxidizing gas flow paths by a seal.
Figure 6:
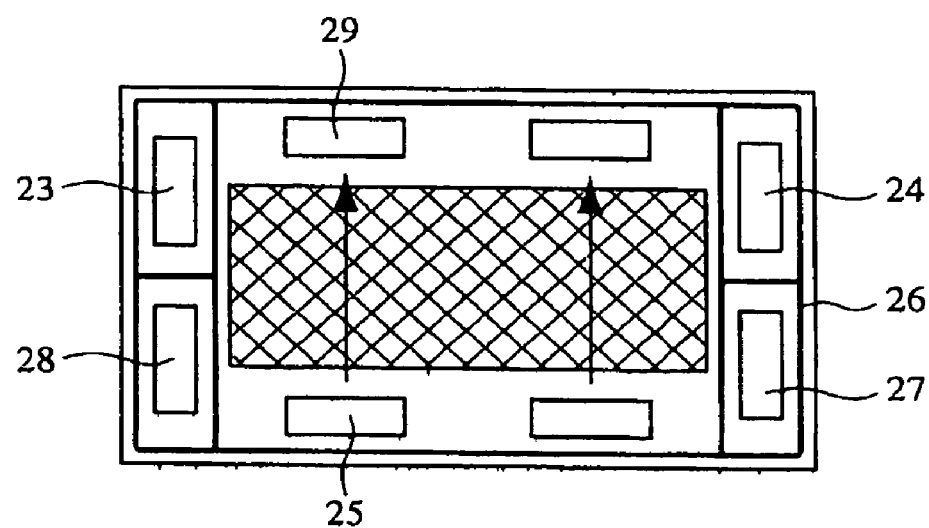
FIG. 6 is a plan view showing a separator plate provided with cooling medium flow paths by a seal.
Figure 7:
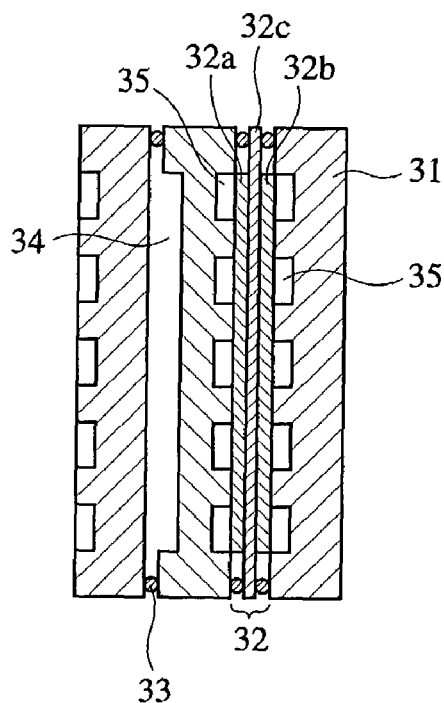
FIG. 7 is a cross-sectional view a showing a unit fuel cell and separator plates for constituting a fuel cell stack.

FIGS. 4-7 show one example of a sealing frame in the form of an O-ring made of a silicone resin, which is attached to each surface of the separator plate. FIG. 4 shows a surface of the separator plate provided with flow paths for a fuel gas defined by a seal 26. The fuel gas exiting from a fuel gas inlet 23 flows through grooves on each surface of the separator plate, which is in contact with the electrode, and is discharged from a fuel gas exit 27. In this case, because an inlet 24 and an exit 28 for an oxidizing gas and an inlet 25 and an exit 29 for a cooling medium are encircled by seals, the oxidizing gas and the cooling medium are neither mixed with the fuel gas nor leaked. Similarly, FIG. 5 shows a surface of the separator plate provided with flow paths for an oxidizing gas defined by a seal 26, and FIG. 6 shows a surface of the separator plate provided with flow paths for a cooling medium defined by a seal 26. FIG. 7 shows the cross section of a unit fuel cell and separator plates for constituting a fuel cell stack.

The fuel cell stack is constituted by unit fuel cells 32 laminated via separator plates 31, each unit fuel cell 32 comprising an electrolyte membrane 32c and anode and cathode catalytic electrodes 32a, 32b bonded to both sides of the electrolyte membrane 32c. Reaction gas flow paths 35 are formed on a surface of the separator plate 31 in contact with the catalytic electrodes 32a, 32b, and seals 33 in contact with the sealing portions of the separator plates 31 sandwiching the unit fuel cell 32 close the reaction gas flow paths 35. Coolant flow paths 34 are formed on a rear surface of the separator plate 31 and sealed by the seals 33 in contact with the sealing portion of the separator plate 31. The separator plates constituting the fuel cell stack are not restrictive, but separator plates on the anode and cathode sides and cooling separator plates may be separate separator plates.

The method for sealing the separator plate may be (i) a sealing method using a frame in the form of a sheet, an O-ring, a hardening-adhesion-type, liquid-hardening material, etc. made of an elastic material such as an organic rubber, for instance, a silicone rubber, an ethylene-propylene (EPDM) rubber, a fluorocarbon rubber, etc., the frame being compression-laminated with the separator plate for sealing with its repulsion; (ii) a sealing method using an inorganic sheet (sheet made of graphite and other ceramic fibers, etc.), which is compressed between the separator plates for sealing, or (iii) caulking, a mechanical seal, etc. Because a carbon separator plate is brittle, it may be destroyed at the time of stacking. Accordingly, the sealing method is preferably the above method (i), in which a soft sealing material having proper repulsion is used for sealing.

After removing the mask from each separator plate having a surface roughened, the separator plates and the unit fuel cells are alternately laminated via sealing frames. End plates are mounted onto both sides of the laminated fuel cell stack, and the stack is fastened in a lamination direction. This secures sufficient gas sealing, because the unit fuel cells are sandwiched by sealing frames.

The present invention will be explained in further detail by the following examples without intention of restricting the scope of the present invention defined by the claims attached hereto.

Example 1

(1) Production of Fuel Cell Separator Plate

70% by weight of synthetic graphite powder and 30% by weight a phenol resin were mixed together, and sufficiently blended by a compression kneader. The resultant blend was charged into a die having a cavity in a shape of a separator plate, to form a flat separator plate.

(2) Surface Roughening

A carbon plate 2 having the same shape as that of the sealing portion of the separator plate 1 was placed on the separator plate 1 to mask the sealing portion as shown in FIG. 1. The separator plate 1 masked as shown in FIG. 2 was placed on a belt conveyor 4 and conveyed at a rate of 0.6 m/minute. With a gun 3 for shot-blasting beads disposed above the belt conveyor 4, abrasive alumina beads were blasted onto an exposed portion 1a of the conveyed separator plate 1, which is to be in contact with an electrode 1, for surface roughening. The blasting conditions were as follows: bead diameters of 0.1-10 μm, a nozzle height of 110 mm, a vibration speed of 75 rpm, and an ejecting pressure of 3 kgf/cm².

(3) Evaluation Test

With respect to the resultant separator plate, surface roughness (Rmax) in its portion in contact with an electrode and its sealing portion was measured using a surface roughness meter (Tokyo Seimitsu Co. Ltd.). Also, with voltage-measuring terminals attached to a periphery of each resultant separator plate, a unit fuel cell was sandwiched by the separator plates at a contact surface pressure of 10 kg/cm². After connecting a pair of voltage-measuring terminals attached to two separator plates to a voltage-measuring apparatus by a code, voltage loss proportional to contact resistance of this battery unit was measured with electric current of 300 A supplied. Further, with 100 kPa of helium (He) and 50 kPa of air supplied to the reaction gas flow paths, the change of pressure with time was measured to determine the degree of leak. The measurement results of the surface roughness (Rmax) in the portion in contact with an electrode, the surface roughness (Rmax) of the sealing portion, the degree of leak, and voltage loss are shown in Table 1.

Comparative Example 1

Each separator plate was produced and evaluated in the same manner as in Example 1 except for subjecting an entire surface of each separator plate to surface roughening without masking its sealing portion. The measurement results are shown in Table 1.

Comparative Example 2

Each separator plate was produced and evaluated in the same manner as in Example 1 except for omitting surface roughening in the separator plate. The measurement results are shown in Table 1.

TABLE 1

| Evaluation Items | | Example 1 | Com. Ex. 1 | Com. Ex. 2 |
|---|---|---|---|---|
| Surface Roughness Rmax (μm) in Contact Portion | | 26.5 | 26.5 | 7.53 |
| Surface Roughness Rmax (μm) in Sealing Portion | | 7.43 | 26.5 | 7.53 |
| Degree of Leak (ml/minute) | He | 0.01 | 1.5 | 0.06 |
| | Air | 0 | 1.5 | 0.07 |
| Voltage Loss (mV) | | 20.25 | 19.1 | 90.2 |

In Example 1, the contact portion had a larger surface roughness (Rmax) than that of the sealing portion by surface roughening in the sealing portion after masking, so that both of the degree of leak and the voltage loss were suppressed. On the other hand, in Comparative Example 1, because of surface roughening without masking, both of the sealing portion and the and contact portion had a large surface roughness (Rmax), resulting in a high degree of leak despite of low voltage loss. Also, in Comparative Example 2, because there was no surface roughening at all, both of the sealing portion and the contact portion had a small surface roughness (Rmax), resulting in high voltage loss (contact resistance) despite of a low degree of leak.

Example 2

Figure 8:
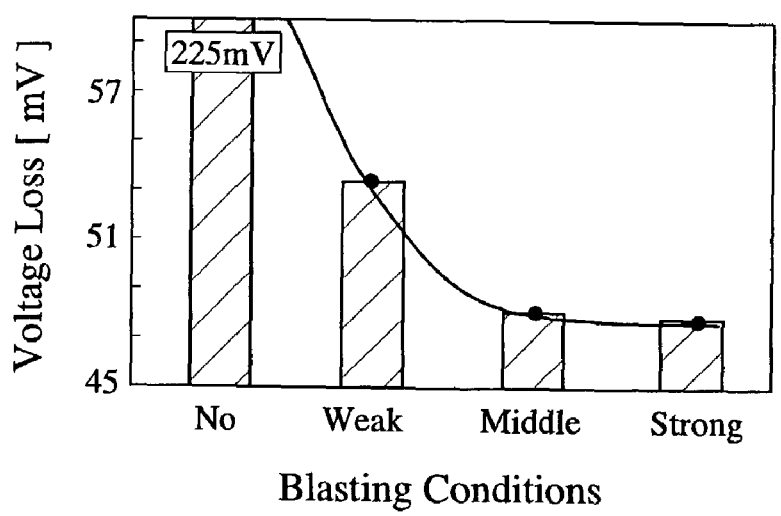
FIG. 8 is a graph showing the variation of voltage loss depending on blasting conditions.

Each fuel cell separator plate was produced in the same manner as in Example 1. With blasting conditions set at three levels of strong, middle and weak as shown in Table 2, each surface of the resultant separator plates was roughened. Next, a battery unit was produced in the same manner as in Example 1, and its voltage loss was measured with electric current of 300 A supplied. The measurement results are shown in Table 2 and FIG. 8.

Comparative Example 3

Each separator plate was produced and evaluated in the same manner as in Example 2 except for omitting surface roughening in the separator plate. The measurement results are shown in Table 2 and FIG. 8.

TABLE 2

| | Example 2 | | | Com. Ex. 3 |
|---|---|---|---|---|
| Blasting Conditions | Weak | Middle | Strong | No |
| Conveyor Speed (m/minute) | 0.6 | 0.3 | 0.6 | — |
| Nozzle Height (mm) | 245 | 110 | 110 | — |
| Vibration Speed (rpm) | 75 | 75 | 75 | — |
| Ejecting Pressure (kgf/cm²) | 2 | 3 | 3 | — |
| Controlled Surface Roughness (μm) | 10-15 | 15-25 | 25-35 | 7.5 |
| Voltage Loss (mV) | 53.2 | 48.0 | 47.8 | 225 |

In Example 2, surface roughness (Rmax) was controlled to 10-35 μm by surface roughening, so that the voltage loss (contact resistance) of Example 2 was drastically decreased than that of Comparative Example 3.

As described above, in the fuel cell separator plate of the present invention, a resin is removed by surface roughening from a portion of the separator plate, which is to be in contact with an electrode, while its sealing portion, which does not contact with an electrode, keeps a smooth surface. As a result, contact resistance between the separator plate and an electrode is decreased, while suppressing gas leak by increasing gas tightness. Therefore, it is possible to provide the fuel cell of the present invention with increased efficiency in generating electricity.

What is claimed is:

1. A solid polymer electrolyte fuel cell separator plate,
wherein said separator plate comprises a portion in contact with an electrode, and a sealing portion in contact with a seal provided around said contact portion, said contact portion having a larger surface roughness (Rmax) than that of said sealing portion;
wherein said contact portion has a surface roughness (Rmax) of 15-40 μm, and said sealing portion in contact with a seal in a form of a preformed sheet or a preformed O-ring made of an elastic material has a surface roughness (Rmax) of 5-10 μm;
wherein the solid polymer electrolyte fuel cell separator plate is a molded separate plate made of a composite carbon material; and
wherein said composite carbon material comprises carbon and a thermosetting resin;
wherein the thermosetting resin is provided in said sealing portion.

2. The solid polymer electrolyte fuel cell separator plate of claim 1, wherein said sealing portion is kept in an as-molded state without surface treatment.

* * * * *